United States Patent Office 3,337,921
Patented Aug. 29, 1967

3,337,921
INJECTOR FOR INJECTION MOULDING
MACHINES
Herbert Kaiser, Somerset, and John Alfred Bradley-Lovekin, Bradford-on-Avon, England, assignors to Avon Rubber Company Limited, Melksham, England, a company of Great Britain and Northern Ireland
Filed Dec. 17, 1964, Ser. No. 418,971
Claims priority, application Great Britain, Dec. 18, 1963, 50,019/63
5 Claims. (Cl. 18—30)

This invention relates to an injector for an injection moulding machine.

For the injection moulding of plastics, there are essentially three basic types of injector:

(1) Piston type injector where a hydraulically or mechanically actuated piston forces the material through a nozzle or orifice into a mould.

(2) Screw injector where a screw operating in a cylinder filled with the material is twisted and withdrawn in a helical motion towards the feed end of the cylinder to bring a quantity of material in front of the screw, whereupon the material is injected through a nozzle or orifice into the mould by hydraulically or mechanically actuated axial movement of the screw.

(3) A combination of screw feed and piston operation where the screw masticates the material and feeds it into a chamber from which a piston acting at an angle to the screw axis injects it through a nozzle or orifice.

When injection moulding synthetic resins in pellet form, any of the three alternatives gives satisfactory results and can be used as a matter of preference. There is relatively little power lost during the axial movement and the greater part of the injection force available can be used to get the material into the mould.

When injection moulding natural or synthetic rubber, which is mostly in strip form, and like elastomeric polymers, it has been shown that the greater part of the injection force is expended in overcoming the shear resistance of the cold rubber at the feed end. Only method 3 outlined above overcomes this disadvantage but in turn gives rise to porosity due to the difficulty in filling the swept volume of the chamber with homogeneous material.

According to the present invention we provide an injector for an injection moulding machine, said injector having a cylinder with a forward end and a rear end, a rotating screw for moving the material to be moulded into the cylinder through the rear end thereof, and a piston which is swept along the cylinder to extrude the material through the forward end of the cylinder and through an injection nozzle or orifice.

The piston carries the injection nozzle which protrudes from the forward end of the cylinder and a bore through the nozzle for the extruded material leads also through the piston, the arrangement being such that the piston is swept along the cylinder by relative movement between the nozzle and the casing of the injector, thereby causing material behind the piston to pass through the bore. It is preferred that the axis of the piston be coincident with or parallel to the axis of the screw, though they may be at an angle to each other.

The invention will now be described with reference to the accompanying drawings, wherein.

Figure 1:
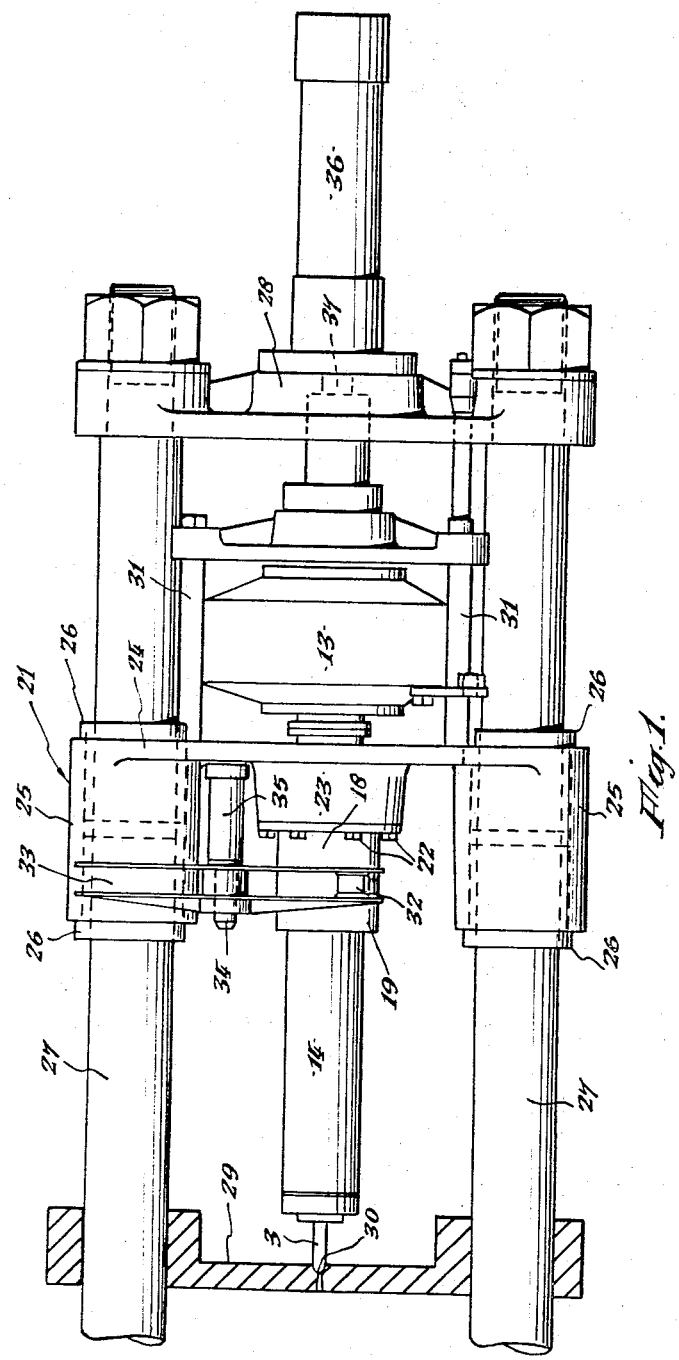
FIGURE 1 is a plan view, showing one form of injector for an injection moulding machine according to the invention, and associated apparatus.
Figure 2:
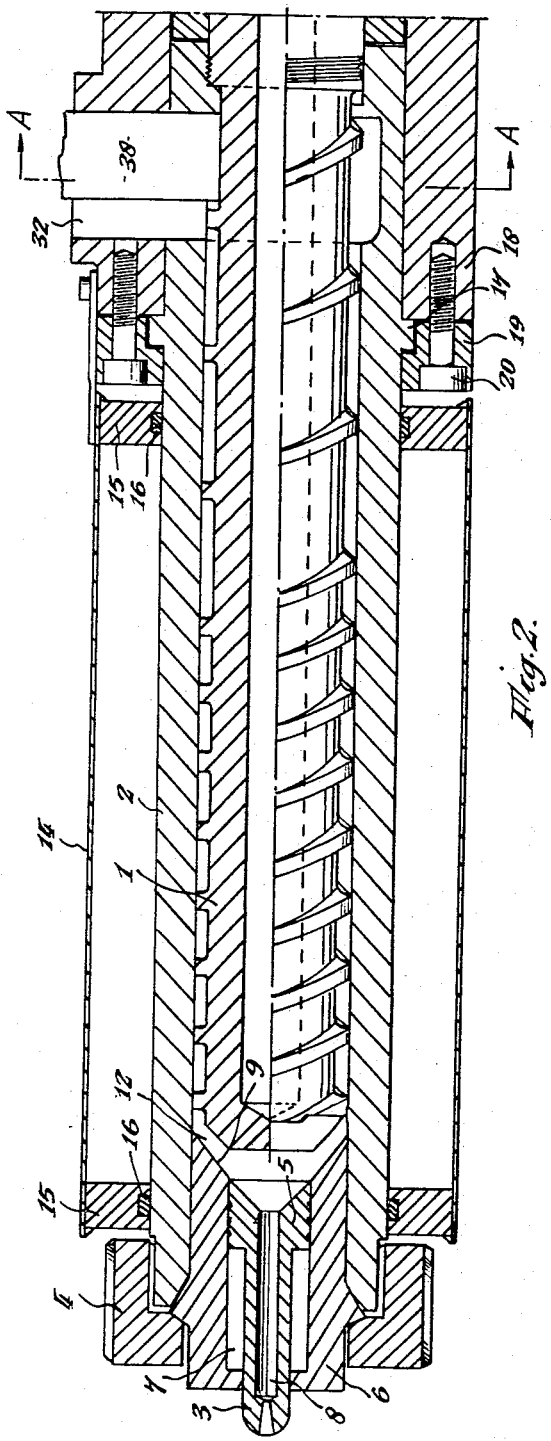
FIGURE 2 shows on a larger scale the injector in section.
Figure 3:
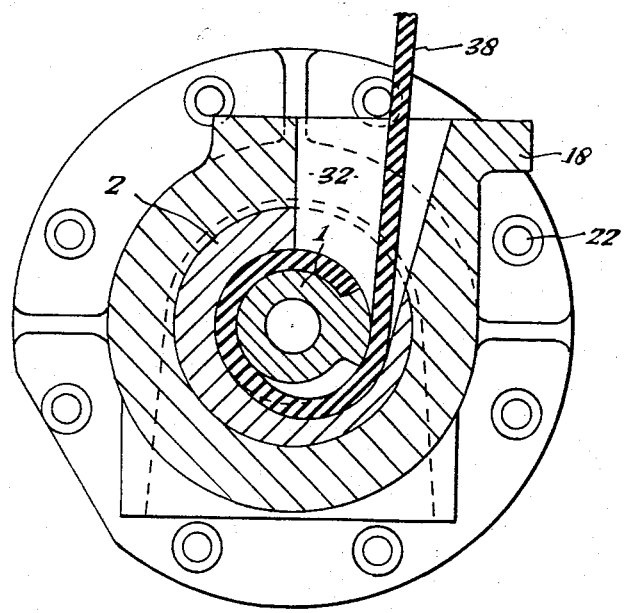
FIGURE 3 is a section on the line A—A of FIG. 2.

In the form of injector shown in FIGS. 1 to 3, a screw 1 rotates in an extruder barrel 2, this screw being operated in known manner by a motor housed in the motor casing 13. At its front end the barrel 2 may be, as shown in the drawing, surrounded by a jacket 14 provided with an inlet and outlet (not shown) for heating or cooling fluid, the jacket 14 having annular end pieces 15 with a groove for an O-ring 16, whereby a fluid-tight seal is maintained between the end pieces 15 and the barrel 2.

Behind the rear end of the jacket 14, the barrel 2 is formed with a shoulder 17, which forms an abutment on one side for a carrying ring 18 and on the other side for a securing ring 19 which is bolted to the carrying ring 18 by bolts 20, thus clamping the barrel 2 to the carrying ring 18. The carrying ring 18, which is formed with the inlet port 32 for the material to be fed into the moulding machine, is itself bolted to the slide frame 21 through the bolts 22. As can be seen from FIG. 1, the slide frame 21 comprises a boss 23 to which the ring 18 is bolted, a transverse web 24, and side bosses 25, each having two sliding bearing bushes 26 by means of which the slide frame is mounted for movement along posts 27 rigidly fixed at one end to a stationary frame 28 and at the other end to the platen carrier (not shown). The platen carrier may be of any suitable type and is no part of the invention, but the front face 29 of the platen and sprue opening 30 are shown in FIG. 1.

It will be seen from FIG. 1 that the motor casing 13 is attached to the rear of the transverse web 24 through posts 31. A suitable magazine for the material to be fed into the injector may be mounted in front of the web 24 and above the inlet port 32. In the figure, it is shown as a reel 33 for raw rubber in strip form, the reel 33 being mounted on a shaft 34 on which it is free to rotate, and being retained thereon with any suitable quick release fastening (not illustrated). The shaft 34 is fixed to the web 24.

Mounted on the stationary frame 28 is a double-acting hydraulic ram 36 which can be operated to reciprocate the ramrod 37, the front end of which is secured to a boss behind the motor housing 13, so that movement of the ram 37 moves the whole assembly mounted on the slide frame 21 along the posts 27.

Referring now to FIGURES 2 and 3, it can be seen that the front end of the barrel 2 has mounted therein an element 6, the rear part of which has been bored to provide a cylinder 7, within which moves a piston 5 made in one piece with a nozzle 3 of smaller diameter which protrudes through an opening in the front end of the element 6. An axial bore 8 leads through the nozzle 3 and piston 5. As can be seen from the drawing the rear end of the element 6 is chamfered at 9 so that the material to be moulded flows smoothly into the cylinder 7, and the rear end of the piston 5 is similarly shaped to give smooth flow of the material into the bore 8. The element 6 is held in place by a nut 4 which is screwed on the barrel 2 and it will be appreciated that the element 6 can readily be removed when desired and replaced by another element of different length or providing a different length of cylinder.

In FIGURES 2 and 3 a strip 38 of raw rubber from the magazine 33 (not shown in these figures) can be seen passing through the inlet port 32, and raw rubber fills the whole space between the threads of the screw 1 and the barrel 2, as well as the chamber 12 in front of the screw 1, and the bore 8.

In use, the hydraulic ram is operated to move the slide frame to the left and to bring the nozzle 3 against the sprue opening 30 (unless of course it is already in this position). Then, if the piston 5 is in its rearward position (as shown in FIG. 2), the hydraulic pressure in the ram is reduced, and the motor for the screw 1 is actuated to rotate the screw and force raw rubber from the inlet port end of the screw towards the chamber 12. The increase of pressure in the raw rubber caused by rotation of the screw 1 is not sufficient to force the rubber through the sprue opening 30 into the injection moulds (even assuming these are ready for filling) but it is sufficient to move the piston 5 along the cylinder 7; in actual fact, the piston 5 does not move, since the nozzle 3 is abutting the front face 29 of the platen, but the element 6, and of course all the rest of the assembly mounted on the slide frame 21 moves away from the sprue opening 30 (i.e., to the right as shown in FIGS. 1 and 2).

When the piston is at the front end of the cylinder 7, the injector is loaded. During the loading process, the rubber, which is cold as it enters the inlet port 32, becomes masticated and a considerable rise of temperature occurs along the length of the barrel. In order to inject the rubber, which now fills the cylinder 7 to the rear of the piston, into the moulds of the moulding machine for curing, the hydraulic pressure behind the piston of the ram 36 is increased, and the slide frame and whole injector mounted thereon (with the exception of the piston 5 and nozzle 3) is moved to the left, forcing the masticated rubber through the bore 8 into the sprue opening.

What we claim and desire to secure by Letters Patent is:

1. An injector for an injection moulding machine, said injector having a barrel with a front end and a rear end, a member within the front end of the barrel providing a cylinder an apertured front end and with an open rear end, means for detachably securing the member within the barrel, a piston operable within the cylinder, a nozzle carried by the piston and slidable within the aperture in the front end of the cylinder, a bore through the nozzle and the piston leading to the rear of the piston, a rotatable feed screw within the barrel behind the cylinder to feed material to be moulded through the open rear end of the cylinder, an inlet aperture through the barrel for the material to be moulded, said aperture lying behind the front end of the feed screw, rigidly fixed posts located parallel to the axis of the cylinder, a frame slidable on the posts and rigidly attached to the barrel and means for sliding the frame along the posts.

2. An injector according to claim 1 wherein the bore runs axially through the piston.

3. An injector for an injection moulding machine, said injector having a cylinder with a forward end and an open rear end, a barrel with a front end which leads directly into the open rear end of the cylinder, a piston within the cylinder, a rotatable feed screw within the barrel to feed material to be moulded into the cylinder through its open rear end, means for introducing material to be moulded into the barrel at a position remote from its front end for feeding forward by the feed screw, an injection nozzle in front of the piston and carried by the piston, and a bore leading through the injection nozzle and the piston to the rear of the piston.

4. An injector according to claim 3 wherein means are provided for moving the injector along the axis of the cylinder.

5. An injector according to claim 3 wherein the axis of the cylinder is coincident with the axis of the barrel.

References Cited

UNITED STATES PATENTS

| 2,414,948 | 1/1947 | Hermanns et al. | 18—30 |
| 3,007,202 | 11/1961 | Wucher | 18—30 |
| 3,032,819 | 5/1962 | Gasmire | 18—30 |
| 3,097,396 | 7/1963 | Ludwig | 18—30 |
| 3,194,868 | 7/1965 | Shaw | 18—30 X |

FOREIGN PATENTS

| 236,101 | 2/1964 | Austria. |
| 609,799 | 11/1960 | Canada. |

WILLIAM J. STEPHENSON, *Primary Examiner.*